(No Model.)
O. STODDARD.
KNOB ATTACHMENT.
No. 334,819. Patented Jan. 26, 1886.
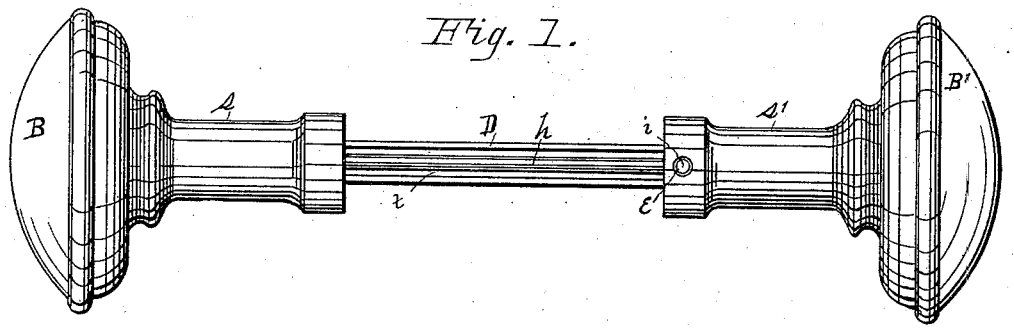
Fig. 1.
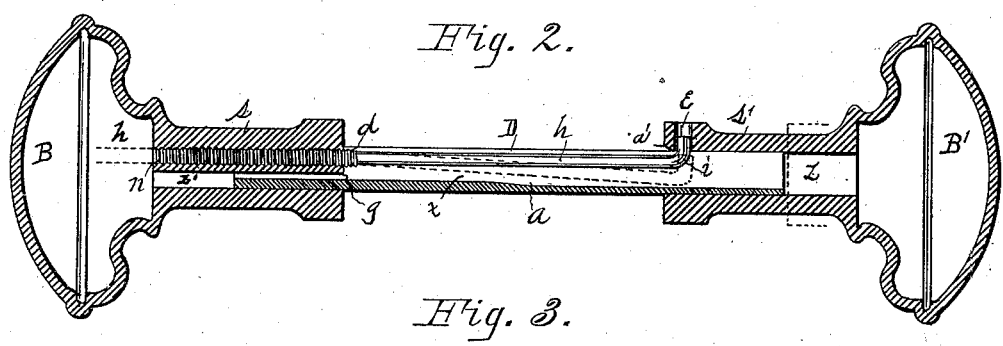
Fig. 2.
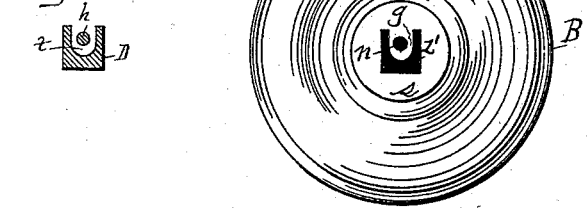
Fig. 3.
Fig. 4.
WITNESSES:
C. A. Preston
G. W. Russell
INVENTOR:
Oscar Stoddard
by Roscoe B. Wheeler
Atty

UNITED STATES PATENT OFFICE.

OSCAR STODDARD, OF DETROIT, MICHIGAN.

KNOB ATTACHMENT.

SPECIFICATION forming part of Letters Patent No. 334,819, dated January 26, 1886.

Application filed June 19, 1885. Serial No. 169,172. (No model.)

*To all whom it may concern:*

Be it known that I, OSCAR STODDARD, a citizen of the United States, residing at Detroit, in the county of Wayne and State of Michigan, have invented certain new and useful Improvements in Knob Attachments; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My present invention relates to the manner of attaching the shanks of door-knobs together, so that they may be adjusted toward or from each other to accommodate the varying thickness of doors, the parts being readily adjusted and firmly held without the aid of washers and screws, as is common; and my invention consists in the combination of devices, as hereinafter set forth, and particularized in the claim.

In the drawings, forming a part of this specification, Figure 1 is an isometrical view of devices embodying my invention. Fig. 2 is a longitudinal section thereof. Fig. 3 is a face view of the knob B and its shank. Fig. 4 is a detail in cross-section.

The shank $s'$ of the knob $B'$ is provided with a square hole, $z$, which extends longitudinally through said shank, as shown in Fig. 2. Through said hole one end of the spindle D works freely. The shank $s'$ is also provided with a locking-hole, E, which passes through the neck of the shank entering the opening $z$ at a right angle. (See Figs. 1 and 2.) The shank $s$ of the knob B is provided with an opening, $z'$, to receive the opposite end of the spindle D. An arm, $g$, is formed in the neck of the shank, as shown in Figs. 2 and 3, which extends into the opening $z'$. Said arm has a screw-threaded hole, $n$, and when the spindle D is inserted said arm extends into the longitudinal recess or channel $t$, formed in the spindle. Said spindle is square in cross-section. The channel or slot $t$ extends the full length of the spindle D, as shown in Fig. 2. I employ an adjustable coupling-rod, $h$, having the free end $i$ bent at right angles to the body, as shown in Fig. 2. The opposite end of said rod is screw-threaded at $d$, and is secured within the threaded hole $n$ of the arm $g$, as shown in Fig. 2. The arm $g$, extending into the recess $t$ of the spindle, locates the coupling-rod within said recess, as shown in Figs. 2 and 4, the curved end portion extending outward. (See Fig. 2.) The shank $s'$ of the knob $B'$ is then passed over the opposite end of the spindle, the end of the shank $s'$ meeting the upturned end $i$ of the coupling-rod $h$, when the slanting portion $a'$ of the shank will press said curved portion of the rod down, as shown in dotted lines of Fig. 2, until the curved portion $i$ enters the locking-hole E, as shown in Figs. 1 and 2, thus securing the parts together.

The parts are placed in position in the following manner: The coupling-rod $h$, supported by the shank $s$, is passed through the door and lock, when the spindle D is passed through the door and lock from the opposite direction, its end entering the opening in the end of the shank $s$. The shank $s'$ of the knob $B'$ is then passed over the opposite end of the spindle, the knobs being pressed toward each other until the curved portion $i$ of the spring-metal coupling-rod enters the hole E of the shank, when the parts will be firmly secured. Should the door be thin, the rod $h$ is screwed into the neck $g$, its end projecting into the hollow knob B, as shown by dotted lines of Fig. 2, when the ends of the shanks $s$ $s'$ will be drawn toward each other when coupled; or should the door be thick, the rod $h$ is unscrewed or extended outward, when the shanks of the knobs will be thrown apart, the adjusting being done before the parts are finally locked together.

To remove the knobs from the door, the point $i$ of the rod is pressed down through the hole E by a pointed tool or wire to the position of dotted lines in Fig. 2, when the knob-shank $s'$ may be removed, the spindle D drawn out, and the knob and rod $h$ also from the opposite side of the door.

What I claim as new is—

The combination, with the knobs, and the shanks $s\ s'$, having openings $z\ z'$, of the longitudinally-recessed spindle, the shank $s$ having the arm $g$, the coupling-rod $h$, screw-threaded thereto, and adapted to be housed within the spindle, said rod having the curved portion $i$, adapted to engage the hole E of the shank $s'$, as and for the purposes set forth.

In testimony whereof I affix my signature in presence of two witnesses.

OSCAR STODDARD.

Witnesses:
  WM. H. DOYLE,
  JNO. G. DOYLE.